United States Patent
Schirmer (10) Patent No.: US 11,220,035 B2
(45) Date of Patent: Jan. 11, 2022

(54) COMPLEX FILMS MADE FROM MODULAR DISK COEXTRUSION DIE WITH OPPOSING DISK ARRANGEMENT

(71) Applicant: Henry G. Schirmer, Spartanburg, SC (US)

(72) Inventor: Henry G. Schirmer, Spartanburg, SC (US)

(*) Notice: Subject to any disclaimer, the term of this patent is extended or adjusted under 35 U.S.C. 154(b) by 39 days.

(21) Appl. No.: 16/860,152

(22) Filed: Apr. 28, 2020

(65) Prior Publication Data

US 2020/0391427 A1   Dec. 17, 2020

Related U.S. Application Data

(63) Continuation-in-part of application No. 16/563,629, filed on Sep. 6, 2019.
(Continued)

(51) Int. Cl.
*B29C 48/49* (2019.01)
*B29C 48/25* (2019.01)
(Continued)

(52) U.S. Cl.
CPC .............. *B29C 48/49* (2019.02); *B29C 48/08* (2019.02); *B29C 48/10* (2019.02); *B29C 48/185* (2019.02);
(Continued)

(58) Field of Classification Search
CPC ..... B29C 48/49; B29C 48/2566; B29C 48/08; B29C 48/10; B29C 48/185;
(Continued)

(56) References Cited

U.S. PATENT DOCUMENTS 2,820,249 A   1/1958   Colombo
3,308,508 A   3/1967   Schrenk
(Continued)

FOREIGN PATENT DOCUMENTS

DE   19927556   12/2000
EP    0471879    2/1992
(Continued)

OTHER PUBLICATIONS

European Search Report and Opinion for EP Application 20179040.9, dated Oct. 20, 2020.
(Continued)

*Primary Examiner* — Joseph S Del Sole
*Assistant Examiner* — Lawrence D. Hohenbrink, Jr.
(74) *Attorney, Agent, or Firm* — Maxwell J. Petersen; FisherBroyles, LLP (57) ABSTRACT

A modular disk coextrusion die is formed of a plurality of cells stacked together. Each cell includes a symmetrical arrangement of thin annular disks, including a central routing disk and two distribution disks on both sides of the central routing disk. The distribution disks are oriented so that their respective distribution inlet openings oppose each other by about 180 degrees. The symmetrical arrangement permits each cell to process the melt streams in a manner that provides enhanced layer uniformity and bubble stability. By stacking several cells, blown films having up to several hundred layers can be made using twelve, twenty-four or more polymer melt streams. Complex films made from the modular disk coextrusion die are also provided.

40 Claims, 7 Drawing Sheets

Related U.S. Application Data (60) Provisional application No. 62/902,172, filed on Sep. 18, 2019, provisional application No. 62/861,529, filed on Jun. 14, 2019.

(51) Int. Cl.
  B29C 48/08 (2019.01)
  B29C 48/10 (2019.01)
  B29C 48/18 (2019.01)
  B29C 48/335 (2019.01)
  B29C 48/255 (2019.01)
  B29C 48/71 (2019.01)
  B32B 7/02 (2019.01)
  B32B 27/08 (2006.01)
  B32B 27/30 (2006.01)

(52) U.S. Cl.
  CPC ...... *B29C 48/2566* (2019.02); *B29C 48/3363* (2019.02); *B29C 48/255* (2019.02); *B29C 48/71* (2019.02); *B32B 7/02* (2013.01); *B32B 27/08* (2013.01); *B32B 27/306* (2013.01); *B32B 2250/05* (2013.01); *B32B 2307/514* (2013.01)

(58) Field of Classification Search
  CPC ... B29C 48/3363; B29C 48/255; B29C 48/71; B32B 7/02; B32B 27/08; B32B 27/306; B32B 2250/05; B32B 2307/514
  USPC .......................................................... 425/464
  See application file for complete search history.

(56) References Cited

U.S. PATENT DOCUMENTS

| | | | |
|---|---|---|---|
| 3,321,803 A | 5/1967 | Corbett | |
| 3,565,985 A | 2/1971 | Schrenk et al. | |
| 3,756,758 A | 9/1973 | Prall | |
| 3,759,647 A | 9/1973 | Schrenk et al. | |
| 3,924,990 A | 12/1975 | Schrenk | |
| 3,980,744 A | 9/1976 | Cogswell | |
| 4,125,585 A | 11/1978 | Rosenbaum | |
| 4,167,383 A | 9/1979 | Murakami et al. | |
| 4,208,175 A | 6/1980 | Rosenbaum | |
| 4,249,875 A | 2/1981 | Hart et al. | |
| 4,669,965 A | 6/1987 | Murakami | |
| 4,715,803 A | 12/1987 | Koppa | |
| 4,772,195 A | 9/1988 | Touchet | |
| 4,798,526 A | 1/1989 | Briggs et al. | |
| 4,832,589 A | 5/1989 | Gini et al. | |
| 4,889,477 A | 12/1989 | Wortberg et al. | |
| 5,009,648 A * | 4/1991 | Aronoff | B32B 27/304 604/332 |
| 5,035,596 A | 7/1991 | Pohl | |
| 5,076,776 A | 12/1991 | Yamada et al. | |
| 5,103,337 A | 4/1992 | Schrenk et al. | |
| 5,110,530 A | 5/1992 | Havens | |
| 5,292,472 A | 3/1994 | Tompkins | |
| 5,516,472 A | 5/1996 | Laver | |
| 5,518,036 A | 5/1996 | DeMasters et al. | |
| 5,538,411 A | 7/1996 | Gates | |
| 5,690,972 A | 11/1997 | Planeta et al. | |
| 5,723,157 A | 3/1998 | Grutjen | |
| 5,762,971 A | 6/1998 | Schirmer | |
| 6,000,926 A | 12/1999 | Schirmer | |
| 6,082,025 A | 7/2000 | Bonk | |
| 6,383,589 B1 | 5/2002 | Akutagawa | |
| 6,413,595 B1 | 7/2002 | Schirmer | |
| 8,241,736 B2 | 8/2012 | Ramli et al. | |
| 8,870,561 B2 | 10/2014 | Schirmer | |
| 10,611,129 B2 | 4/2020 | Schirmer | |
| 2001/0000234 A1 | 4/2001 | Helms, Jr. et al. | |
| 2001/0015513 A1 | 8/2001 | Schaftingen | |
| 2008/0274349 A1 | 11/2008 | Giammatteo | |
| 2009/0087654 A1 | 4/2009 | Ling | |
| 2010/0072655 A1 | 3/2010 | Roberts et al. | |
| 2010/0215879 A1 | 8/2010 | Dooley | |
| 2010/0227136 A1 | 9/2010 | Ramli | |
| 2011/0227922 A1 | 9/2011 | Rivett | |
| 2011/0264057 A1 | 10/2011 | Eversull | |
| 2013/0009336 A1 | 1/2013 | Ausen et al. | |
| 2014/0363600 A1 | 12/2014 | Dooley | |
| 2016/0271904 A1 * | 9/2016 | Maia | B32B 37/153 |
| 2017/0361582 A1 * | 12/2017 | Planeta | B65D 1/0215 |
| 2018/0029338 A1 | 2/2018 | Schirmer | |

FOREIGN PATENT DOCUMENTS

| | | |
|---|---|---|
| EP | 0626247 | 11/1994 |
| FR | 2625941 | 7/1989 |
| GB | 2161745 | 1/1986 |
| WO | 0076765 | 12/2000 |
| WO | 2011119323 | 9/2011 |
| WO | 2016086314 A1 | 6/2016 |
| WO | 2017083633 A1 | 5/2017 |

OTHER PUBLICATIONS

European Search Report and Opinion for EP Application No. 20168535.1, dated Oct. 21, 2020.

Schirmer et al., "Nano-Layer Structural Advances In Shrink Films," SPE Polyolefins Conference, Houston, Texas, Feb. 2013, 13 pages.

Schrenk et al., "Coextruding Multilayer Blown Film—Part 1," SPE Journal, vol. 29 pp. 38-42, Jun. 1973.

Schrenk et al., "Coextruding Multilayer Blown Film—Part 2," SPE Journal, vol. 29 pp. 43-47, Jul. 1973.

* cited by examiner

COMPLEX FILMS MADE FROM MODULAR DISK COEXTRUSION DIE WITH OPPOSING DISK ARRANGEMENT

RELATED APPLICATIONS

The present invention is a continuation-in-part of U.S. application Ser. No. 16/563,629, filed on Sep. 6, 2019, which in turn claims priority based on U.S. Provisional Application 62/861,529, filed on Jun. 14, 2019. The present application also claims priority based on U.S. Provisional Application 62/902,172, filed on Sep. 18, 2019.

FIELD OF THE INVENTION

This present invention is directed to a modular disk coextrusion die having an opposing layer sequence that permits coextrusion of a multilayer blown film having a higher number of layers, and to complex films made from the modular disk coextrusion die.

BACKGROUND OF THE INVENTION

Figure 4:
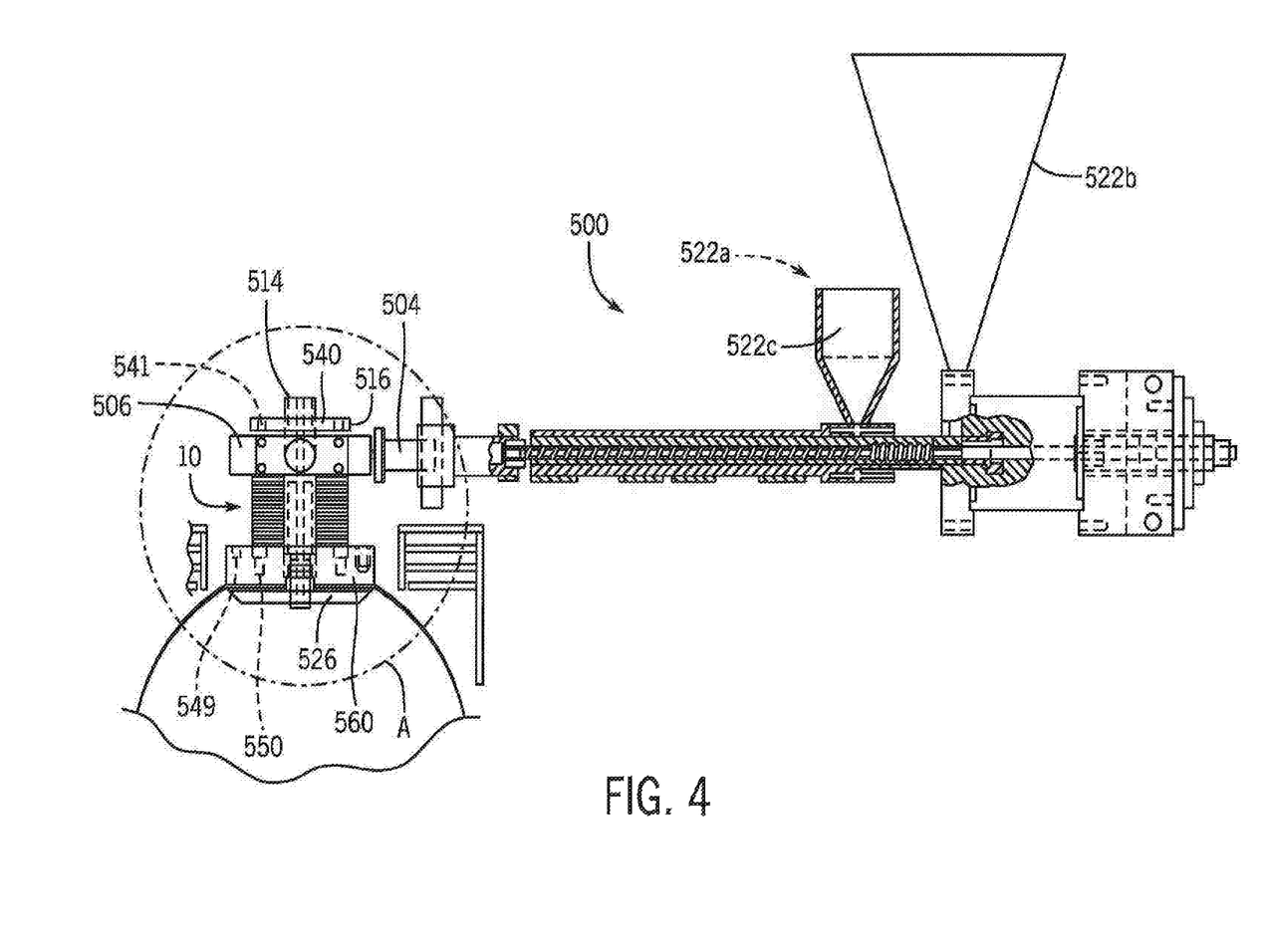
FIG. 4 is an exemplary cross-sectional view of a coextrusion device which may employ a modular disk coextrusion die of the invention.

Modular disk coextrusion dies are known for providing multilayer blown films having high numbers of layers. U.S. Pat. Nos. 5,762,971 and 6,000,926, both issued to Schirmer, disclose an original modular disk coextrusion die that includes a plurality of cells of thin annular disks stacked on top of each other. Each cell includes, in sequence, an end cap disk, a distribution disk, an internal cap disk and a spreader disk (referred to as a spacer disk in the patents). In FIG. 4 of each patent, seven cells are stacked on top of each other and another end cap disk is added to enable production of a seven-layer blown film using melt streams that are individually processed into film layers in each of the cells. The disks and cells are bolted together to make a single seven-layer die. Each of the cells produces one layer of the multilayer film.

The number of layers in the multilayer film is limited by the number of entry ports that can be formed in the first cap disk of the modular disk coextension die and the number of cells that are stacked together. In FIG. 4 of the foregoing patents, up to twenty-four entry openings are shown to fit around the first cap disk. By stacking twenty-four of the cells together (instead of the seven illustrated), a blown film having up to twenty-four layers can be produced using various combinations of the same or different polymer resins. In practice, the number of entry points is further limited by the fact that some of the entry openings (up to twelve of the twenty-four) are commonly used as bolt holes to bolt the thin annular disks together, thus further limiting the number of polymer streams and the number of layers to perhaps twelve.

U.S. Pat. No. 8,870,561 and pending U.S. application Ser. No. 15/684,751, to Schirmer, describe a layer sequence repeater module for a modular disk coextrusion die. In the layer sequence repeater module, at least one of the cells has been modified to replace the single spreader disk with an alternating sequence of spreader disks and repeater disks. The resulting cell is no longer limited to providing a single layer, but instead can provide many alternating layers of different polymer resins. The foregoing patent and patent application disclose coextruded films having up to twenty-five layers produced using a single cell and up to seventy-seven layers when three of the cells are stacked together.

SUMMARY OF THE INVENTION

The present invention is directed to a modular disk coextrusion die that produces blown films having improved layer uniformity and symmetry and the capability of producing blown films having up to several hundred layers and utilizing up to two dozen or more polymer resins. One feature of the invention is the use of an improved cell of thin annular disks arranged in a stacked configuration having a symmetrical disk arrangement. The improved cell includes a central routing disk that directs the flow of a first melt stream to a first sub-cell on a first side of the central routing disk and directs the flow of a second melt stream to a second sub-cell on a second side of the central routing disk. Each sub-cell includes a distribution disk that is suitably adjacent to or in the vicinity of the central routing disk. Each distribution disk includes a distribution inlet opening, a plurality of outlet openings, and a plurality of channels connecting the distribution inlet opening with the plurality of outlet openings. The cells are stacked together to produce a desired number of layers using a desired number of melt streams.

In order to provide enhanced layer uniformity, symmetry and bubble stability, the two distribution disks within each cell are oriented so that their distribution inlet openings are about 180 degrees opposed to each other. The distribution inlet opening in the first distribution disk in the first sub-cell is about 180 degrees opposed to the distribution inlet opening in the second distribution disk in the second sub-cell. This arrangement facilitates layer uniformity and symmetry because the first and second melt streams enter at points that are 180 degrees opposed.

The first sub-cell further includes a first transition disk in fluid communication with the first distribution disk and a first spreader disk in fluid communication with the first transition disk. The second sub-cell further includes a second transition disk in fluid communication with the second distribution disk and a second spreader disk in fluid communication with the second transition disk. The transitions disks are arranged and configured to transmit molten polymer from the outlet openings in the first and second distribution disks to inlet ports in the respective first and second spreader disks, whereupon each melt stream is spread across a flow region in the respective spreader disk.

Suitably, the thin annular disks are arranged in symmetrical fashion on both sides of the central routing disk. For example, the order of disks in the first sub-cell on the first side of the central routing disk is the first distribution disk (closest to the central routing disk), followed by the first transition disk, and then the first spreader disk. Similarly, the order of disks in the second sub-cell on the second side of the central routing disk is the second distribution disk (closest to the central routing disk), followed by the second transition disk, and then the second spreader disk.

A first cap disk can be positioned at an end of the first sub-cell, adjacent to or in the vicinity of the first spreader disk. The first cap disk includes a first inlet opening for transmitting a first melt stream through corresponding openings in the first spreader disk and first transition disk, to the distribution inlet opening in the first distribution disk. The first cap disk includes a second inlet opening for transmitting a second melt stream through corresponding openings in the first spreader disk, first transition disk, first distribution disk and central routing disk, into the distribution inlet opening in the second spreader disk. An optional second cap disk may be positioned at an end of the second sub-cell, adjacent to or in the vicinity of the second spreader disk. When a plurality of cells is stacked together, there may be only one cap disk between the adjacent cells, typically located at the first end of the first sub-cell of each subsequent cell. In addition to inlet openings, each cap disk includes an annular central opening for receiving molten polymer from the respective spreader disk and extruding it as one layer of a blown film bubble.

Multiple cells may be stacked together to provide a film structure having many layers and optionally using many different polymer melt streams, as explained further below.

With the foregoing in mind, it is a feature and advantage of the invention to provide a modular disk coextrusion die that provides blown films having improved layer uniformity and symmetry and the capability of producing blown films having up to several hundred layers and utilizing up to two dozen or more polymer resins.

It is also a feature of the invention to provide an improved cell for a modular disk coextrusion die that includes a plurality of thin annular disks stacked on both sides of central routing disks in a symmetrical arrangement, whereupon each cell can produce two film layers of a multilayer blown film.

It is also a feature and advantage of the invention to provide a modular disk coextrusion die that includes a complex arrangement of multiple improved cells stacked together, capable of producing multilayer blown films having up to several hundred layers, potentially using dozens of different polymer melt streams.

It is also a feature and advantage of the invention to provide complex annular blown or tubular films having unique and advantageous arrangements of nanolayers, produced using the modular disk coextrusion die of the invention.

The foregoing and other features and advantages will become further apparent from the following detailed description of the invention, read in conjunction with the accompanying drawings.

DETAILED DESCRIPTION OF THE INVENTION

Figure 1:
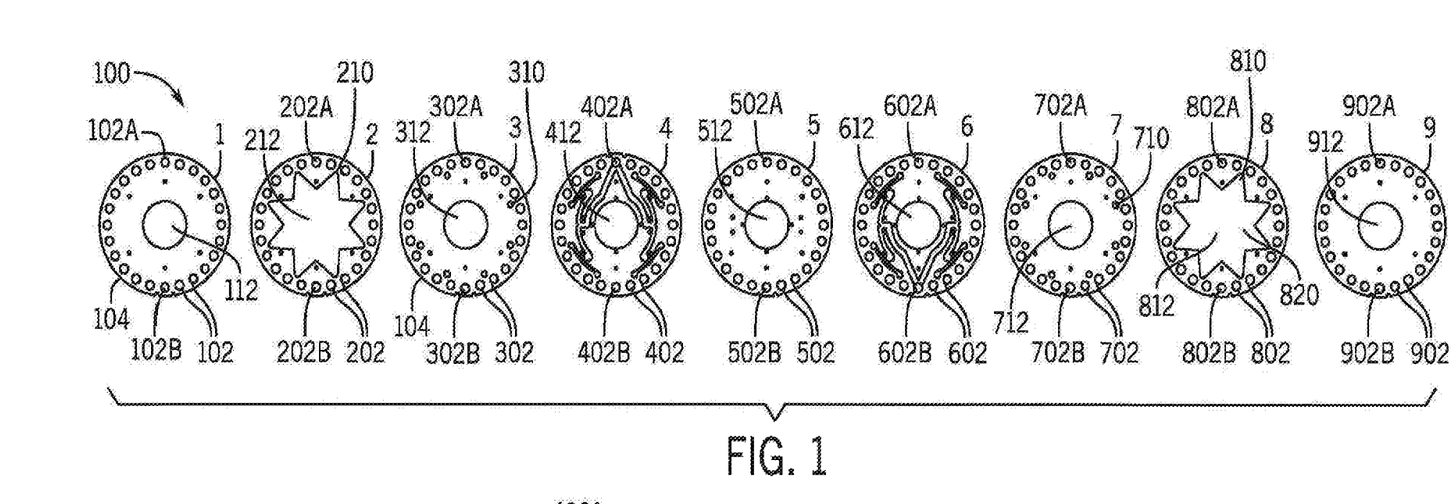
FIG. 1 shows a bottom-to-top lineup of thin annular disks used to form a single cell of the modular disk coextrusion die of the invention, with each disk shown in plan view.

FIG. 1 shows a cell 100 for a modular disk coextrusion die. The cell 100 includes thin annular disks 1-9 which are typically stacked face to face in the order 1-9 but are shown individually in plan view for purposes of illustration. Because only one end cap disk is needed between the adjacent cells, end cap disk 9 of each cell 100 may serve as end cap disk 1 of each subsequent cell 100, this eliminating the need for duplicate end cap disks between adjacent cells.

Each of the thin annual disks 1-9 has twenty-four flow openings (102-902) arranged in an outer ring 104, and a central opening (112-912) that permits extrusion of the blown film bubble. The number of flow openings 102 may vary but is constrained by the available surface area on the disks and the fact that up to twelve of the openings 102-902 in each disk can be used as bolt holes to fasten the stack of thin annular disks together. The flow openings in the respective thin annular disks 1-9 are aligned and may be selectively open or selectively blocked to control the flow of individual polymer streams from one disk to the next within a cell 100, and to additional cells which may be stacked together to form a modular disk coextrusion die.

Disk 1 is a cap disk which receives a plurality of melt streams through some or all of the flow openings 102. Some or all of the flow openings 102 can be selectively utilized to receive any combination of up to twenty-four melt streams composed of the same or different polymers. Because up to twelve of the openings 102 can be used as bolt holes to bolt the stack of thin annular disks together, twelve or more of the openings 102 are typically available to accommodate different melt streams. Cap disk 1 also includes a central annular opening 112 that ultimately forms and extrudes one layer of a blown film bubble, as explained further below.

The cell 100 can be used to process the melt streams of the same or different polymers and form two layers of the blown film bubble. The first melt stream can be fed to opening 102A from a first extruder, whereupon it passes through flow opening 202A in spreader disk 2, flow opening 302A in transition disk 3, and into distribution inlet opening 402A in distribution disk 4, all of which are aligned and in fluid communication with each other. The corresponding aligned flow opening 502A in the central routing disk 5 can be blocked in order to channel the first melt stream completely into distribution disk 4 or can be left open in order to split the first melt stream between different cells as explained below. The second melt stream can be fed to opening 102B from a second extruder, whereupon it passes through flow opening 202B in spreader disk 2, flow opening 302B in transition disk 3, flow opening 402B in distribution disk 4, flow opening 502B in central routing disk 5, and into distribution inlet opening 602B in distribution disk 6, all of which are aligned and in fluid communication with each other. The corresponding flow opening 702B in transition disk 7 can be blocked in order to channel the second melt stream completely into distribution disk 6 or can be left open in order to split the second melt stream between different cells as explained below.

Disk 5 is referred to as the central routing disk because it channels the first melt stream completely into the first distribution disk 4 and channels the second melt stream completely into the second distribution disk 6. The central routing disk 5 has essentially the same configuration as the first cap disk 1 and the optional second cap disk 9, with twenty-four openings 502 aligned with corresponding openings in all the other disks, which may be selectively opened or closed (blocked) to channel the melt streams. The central routing disk 5 is centrally located between the first sub-cell (including distribution disk 4, transition disk 3 and spreader disk 2) that processes the first melt stream and the second sub-cell (including distribution disk 6, transition disk 7 and spreader disk 8) that processes the second melt stream.

Figure 1A:
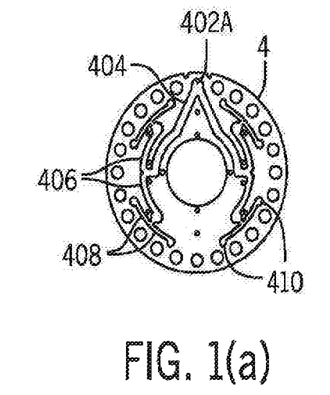
FIG. 1(a) is an enlarged view of the first distribution disk 4 in FIG. 1.
Figure 1B:
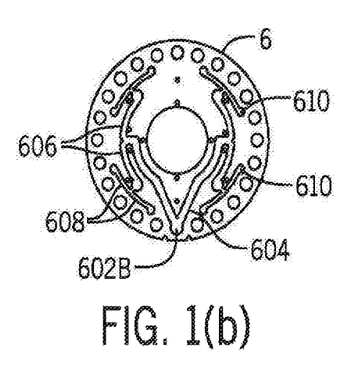
FIG. 1(b) is an enlarged view of the second distribution disk 6 in FIG. 1.

As shown in FIG. 1, the distribution disks 4 and 6 are oriented so that the distribution inlet opening 402A in disk 4 is 180 degrees opposed to the distribution inlet opening 602B in disk 6, and the distribution disks 4 and 6 appear as mirror opposites to each other. Distribution disk 4 includes distribution inlet opening 402A, feeding a plurality of connected channels and subchannels 404, 406 and 408, which divide the first melt stream into eight smaller streams feeding eight outlet openings 410 that are evenly spaced around the distribution disk 4. Distribution disk 6 includes distribution inlet opening 602B, feeding a plurality of connected channels and subchannels 604, 606 and 608, which divide the second melt stream into eight smaller streams feeding eight outlet openings 610 that are evenly spaced around the distribution disk 6.

The first melt stream exits the outlet openings 410 in distributing disk 4 and passes through aligned transition openings 310 in the transition disk 3, then to the similarly aligned flow ports 210 in spreader disk 2, which are in fluid communication with each other. The second melt stream exits the outlets 610 in distribution disk 6 and passes through aligned transition openings 710 in transition disk 7 and into the similarly aligned flow ports 810 in spreader disk 8, which are in fluid communication with each other. The transition disks 3 and 7 are adjacent to the corresponding distribution disks 4 and 6 and are configured like the cap disks 1 and 9 except for the addition of eight equally spaced transition openings 310 and 710 in the transition disks. The transition openings 310 and 710 are positioned to be fully aligned and in fluid communication with the eight outlet openings 410 and 610 in the corresponding distribution disks.

The spreader disks 2 and 8 are positioned adjacent to the corresponding transition disks 3 and 7 and serve the purpose of spreading each distributed melt stream into a flat plane that can then be blown into a layer of the blown film bubble. The spreader disks 2 and 8 include a plurality of flow ports 210 and 810, each connected and leading into a flat flow region 220 and 820. The illustrated spreader disk 2 includes eight of the flow ports 210, which are aligned and in fluid communication with the transition openings 310 in the transition disk 3 and the outlet openings 410 in the distribution disk 4. The illustrated spreader disk 8 includes eight of the flow ports 810, which are aligned and in fluid communication with the transition openings 710 in the transition disk 7 and the outlet openings 610 in the distribution disk 6.

During blown film coextrusion, an appropriate amount of pressurized air is injected through the central annular opening 112 in the first cap disk 1. The spreader disks 2 and 8 expose the processed (flattened) first and second melt streams to that air flow. The first flattened melt stream is thereby extruded, in tubular form, from the flow region 220 in spreader disk 2, through the central annular openings 312, 412, 512, 612, and 712 in disks 3, 4, 5, 6 and 7. The tubular first melt stream combines with the second melt stream in the spreader disk 8 and both melt streams are coextruded together, in the tubular form, through the central annular opening 912 in the second cap disk 9. When two or more cells are stacked together, the second cap disk 9 becomes optional and can be eliminated, because the first cap disk 1 in each subsequent cell 100 performs the same function as the second cap disk 9 in each preceding cell.

Each cell 100 is thus capable of producing two layers of a multilayer blown film. By stacking multiple cells together and using very thin annular disks, selectively welded together as described below, blown films having 300 or more layers can be produced by stacking 150 or more cells together. The number of cells 100 stacked together in a modular disk coextrusion die 10 can be at least four, at least seven, at least ten, at least fifteen, at least twenty-five, at least 50, at least 100 or more, and can be 150 or more when blown films having 300 or more layers are desired.

Figure 2:
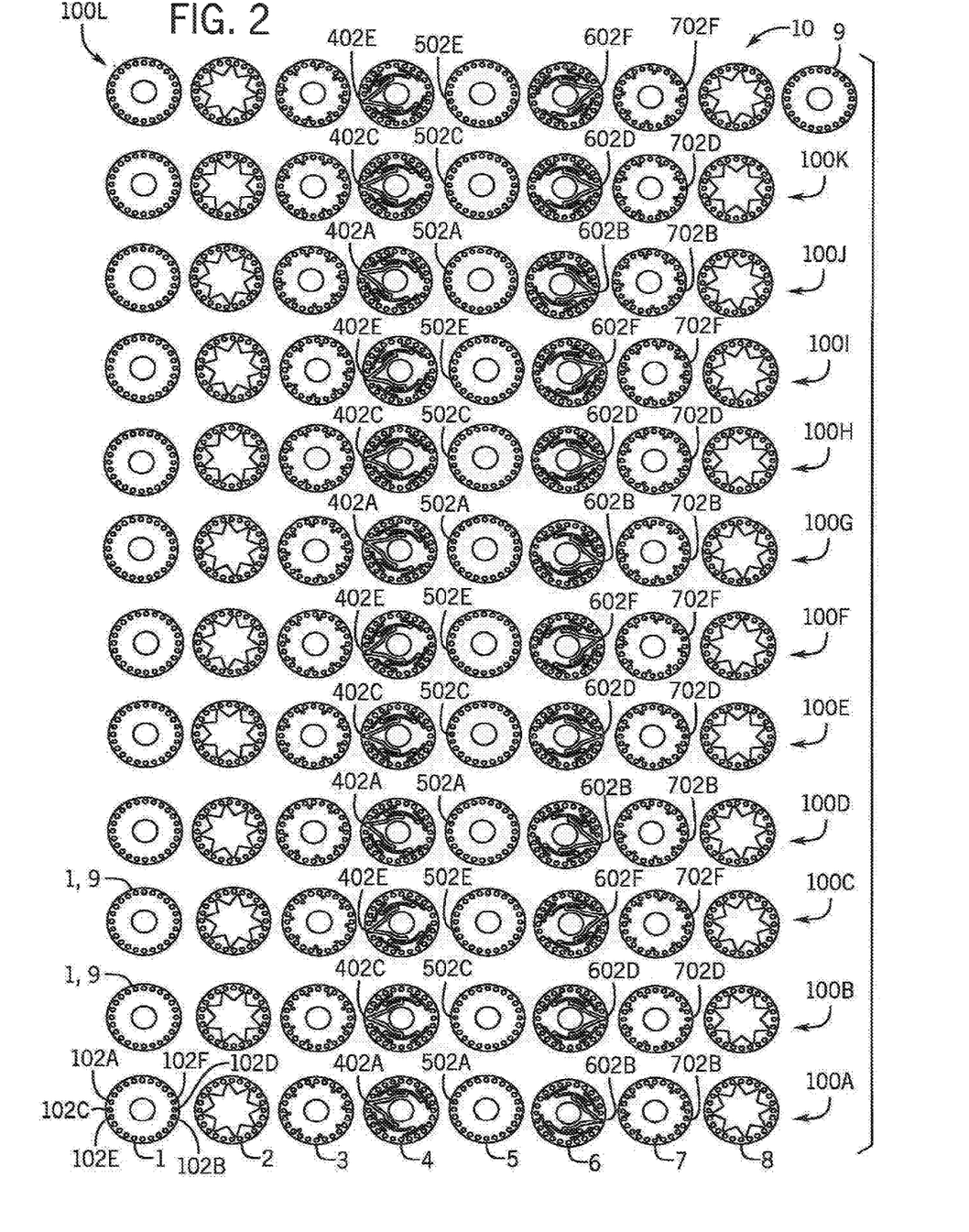
FIG. 2 shows a left-to-right and bottom-to-top lineup of the twelve cells of thin annular disks that can be stacked together to form a modular disk coextrusion die of the invention. The disks, shown in plan view, are stacked from left-to-right within each individual cell, and the twelve cells are stacked bottom-to-top.

FIG. 2 illustrates an exemplary modular disk coextrusion die 10 that includes a stacking arrangement of twelve cells used to provide a multilayer blown film having 24 layers and employing six starting melt streams (half of the number permitted by the configuration). In FIG. 2, each row represents a single cell in which the individual disks 1 through 8 are stacked from left-to-right starting with cap disk 1 in the lower left-hand corner. As explained above, the function of cap disk 9 of each cell is served by cap disk 1 of each subsequent cell and there is no need for duplicate cap disks proceeding from one cell to the next. However, the second cap disk 9 is needed at the end of the stacking arrangement, in this case, at the end of the twelfth cell 100L. The assembled cells are stacked together vertically, with cell 100A at the bottom and cell 100L at the top.

Referring to FIG. 2, the first melt stream enters cap disk 1 through feed opening 102A in cell 100A and flows through the corresponding aligned flow openings in disks 2 and 3, and to the distribution inlet opening 402A in the distribution disk 4. However, unlike the previous description of a single cell (FIG. 1), there is no block in the corresponding opening 502 in the central routing disk 5. Consequently, only some of the first melt stream is processed into a film layer in disks 4, 3, 2 and 1 of the first cell 100A. The remainder of the first melt stream passes completely through the corresponding aligned flow openings in disk 6, 7, 8 and 9 of the first cell 100A, completely through the corresponding aligned flow openings in all nine disks of second and third cells 100B and 100C, and to the fourth cell 100D.

In the fourth cell 100D, some of the remaining first melt stream enters the distribution inlet opening 402A in the corresponding distribution disk 4 and is processed into a film layer in disks 4, 3, 2 and 1 of the fourth cell 100D. Again, there is no blocking of the corresponding flow opening 502A in the central routing disk 5, thus permitting some of the first melt stream to flow completely through cells 100D, 100E and 100F, and into the seventh cell 100G.

In the seventh cell 100G, some of the remaining first melt stream enters the distribution inlet opening 402A in the corresponding distribution disk 4 and is processed into a film layer in disks 4, 3, 2 and 1. Again, there is no blocking of the corresponding flow opening 502A in the central routing disk 5, thus permitting the remaining first melt stream to flow completely through cells 100G, 100H and 100I, and into the tenth cell 100J. The remaining first melt stream enters the distribution inlet opening 402A in the tenth cell 100J and is processed into a film layer in disks 4, 3, 2 and 1 of the tenth cell 100J. In the tenth cell, the corresponding flow opening 502A in the central routing disk 5 is blocked, permitting no further division of the first melt stream.

The first melt stream is thus divided four ways and is used to produce four film layers in cells 100A, 100D, 100G and 100J. As will be further apparent from the description below, these four layers will be the first, seventh, thirteenth and nineteenth layers of the 24-layer film structure.

The second melt steam enters cap disk 1 through feed opening 102B in the first cell 100A and flows through the corresponding aligned flow openings in disks 2, 3, 4 and 5, and to the distribution inlet opening 602B in the distribution disk 6. Unlike the previous description of a single cell (FIG. 1), there is no block in the corresponding opening 702B in the transition disk 7 in cell 100A, and such a block only occurs in the corresponding opening 702B in the tenth cell 100J. Accordingly, the second melt stream flows through the modular disk coextrusion die in much the same fashion as described above for the first melt stream. As explained above, the first melt stream was divided among the distribution disks 4 having the same orientation, whose inlet ports 402A corresponded with the inlet 102A in the first cap disk 1. Because the feed inlet 102B for the second melt stream is 180 degrees opposed to the feed inlet 102A for the first melt stream, the second melt stream will similarly be able to enter only the distribution disks 402B whose feed inlets are 180 degrees opposed to the feed inlet 402A that receives the first melt stream.

As shown in FIG. 2, the proper orientation of distribution inlets 602B for receiving the second melt stream exists only in the first cell 100A, the fourth cell 100D, the seventh cell 100G and the tenth cell 100J. Accordingly, the second melt stream is processed into four film layers using disks 6, 7, 8 and (functional) 9 of cell 100A, disks 6, 7, 8 and (functional) 9 of cell 100D, disks 6, 7, 8 and (functional) 9 of cell 100G, and disks 6, 7, 8 and (functional) 9 of cell 100J. As explained above, disk 1 of each subsequent cell 100B, 100E and 100H acts as a functional disk 9 of each preceding cell 100A, 100D and 100G, and there is no need to duplicate the cap disks 9 between cells. These four layers will be the second, eighth, fourteenth and twentieth layers of the 24-layer film structure.

The third and fourth melt streams enter the first cap disk 1 in cell 100 through feed inlets 102C and 102D, respectively, which are similarly oriented 180 degrees apart from each other. As the third melt stream flows through the modular disk coextrusion die, it will be processed only in those cells whose distribution disks 4 have a distribution inlet opening 402C that corresponds to the feed inlet 102C in the first cap disk 1. As the fourth melt stream flows through the modular disk coextrusion die, it will be processed only in those cells whose distribution disks 6 have an opposing orientation, so that the distribution inlet opening 602D corresponds to the feed inlet 102D in the first cap disk 1.

As shown in FIG. 2, the proper orientation of the distribution disks 4 and 6 receiving the third and fourth melt streams exists only in the second cell 100B, the fifth cell 100E, the eighth cell 100H and the eleventh cell 100K. In those distribution disks, the distribution inlet 402C corresponds to the feed inlet 102C for the third melt stream, and the distribution inlet 602D corresponds to the feed inlet 102D for the fourth melt stream. Accordingly, the third melt stream is processed into four film layers using disks 4, 3, 2 and 1 of the second cell 100B, disks 4, 3, 2 and 1 of the fifth cell 100E, disks 4, 3, 2 and 1 of the eighth cell 100H, and disks 4, 3, 2 and 1 of the eleventh cell 100K. There is no blocking of inlet opening 502C in the central routing disk until the eleventh cell 100K. The third melt stream will form the third, ninth, fifteenth and twenty-first layers of the 24-layer film structure.

The fourth melt stream is processed into four film layers using disks 6, 7, 8 and (functional) 9 of the second cell 100B, disks 6, 7, 8 and (functional) 9 of the fifth cell 100E, disks 6, 7, 8 and (functional) 9 of the eighth cell 100H, and disks 6, 7, 8 and (functional) 9 of the eleventh cell 100K. Again, the role of functional cap disk 9 for each cell is performed by the illustrated cap disk 1 of each subsequent cell. There is no blocking of inlet opening 702D in the transition disk 7 until the eleventh cell 100K. The fourth melt stream will form the fourth, tenth, sixteenth and twenty-second layers of the 24-layer film structure.

The fifth and sixth melt streams enter the first cap disk 1 in cell 100 through feed inlets 102E and 102F, respectively, which are oriented 180 degrees apart from each other. As the fifth melt stream flows through the modular disk die, it will be processed only in those cells whose distribution disks 4 have a distribution inlet opening 402E that corresponds to the feed inlet 102E in the first cap disk 1. As the sixth melt stream flows through the modular disk die, it will be processed only in those cells whose distribution disks 6 have an opposing orientation, so that the distribution inlet opening 602F corresponds to the feed inlet 102F in the first cap disk 1.

As shown in FIG. 2, the proper orientation of the distribution disks 4 and 6 for receiving the fifth and sixth melt streams exists only in the third cell 100C, the sixth cell 100F, the ninth cell 100I and the twelfth cell 100L. In those distribution disks, the distribution inlet 402E corresponds to the feed inlet 102E for the fifth melt stream and the distribution inlet 602F corresponds to the feed inlet 102F for the sixth melt stream. Accordingly, the third melt stream is processed into four film layers using disks 4, 3, 2 and 1 of the third cell 100C, disks 4, 3, 2 and 1 of the sixth cell 100F, disks 4, 3, 2 and 1 of the ninth cell 100I, and disks 4, 3, 2 and 1 of the twelfth cell 100L. There is no blocking of the corresponding inlet opening 502E in the central routing disk 5 until the twelfth cell 100L. The fifth melt stream will form the fifth, eleventh, seventeenth and twenty-third layers of the 24-layer film structure.

The sixth melt stream is processed into four film layers using disks 6, 7, 8, and (functional) 9 of the third cell 100C, disks 6, 7, 8 and (functional) 9 of the sixth cell 100F, disks 6, 7, 8 and (functional) 9 of the ninth cell 100I, and disks 6, 7, 8 and (functional) 9 of the twelfth cell 100L. Because no further cells are illustrated beyond the twelfth cell 100L, that cell includes an actual second cap disk 9. There is no blocking of inlet opening 702F in the transition disk 7 until the twelfth cell 100L. The sixth melt stream will form the sixth, twelfth, eighteenth and twenty-fourth layers of the 24-layer film structure.

The number of cells in the modular disk coextrusion die can be increased to enable production of blown films having several hundred layers. One feature that enables this is the use of very thin disks made of a strong material, such as 16-gauge stainless steel or 22-gauge stainless steel. In one embodiment, the cap disks 1 and 9 (if used) and the central routing disk 5 can each be made of stainless steel, the spreader disks 2 and 8 and distribution disks 4 and 6 can each be made of 16-gauge stainless steel, and the transition disks 2 and 7 can each be made of 16-gauge or 22-gauge stainless steel. Adjacent disks can also be spot-welded or laser-welded together, or fastened together with roll pins, for improved strength and integrity. Adjacent disks can also be cold welded together using a patented process available from Meld Manufacturing Corporation in Christiansburg, Va. For example, a cap disk can be fastened together with a spreader disk, a central routing disk can be fastened together with two distribution disks (one on each side), and/or a transition disk can be fastened together with a spreader disk.

Figure 3:
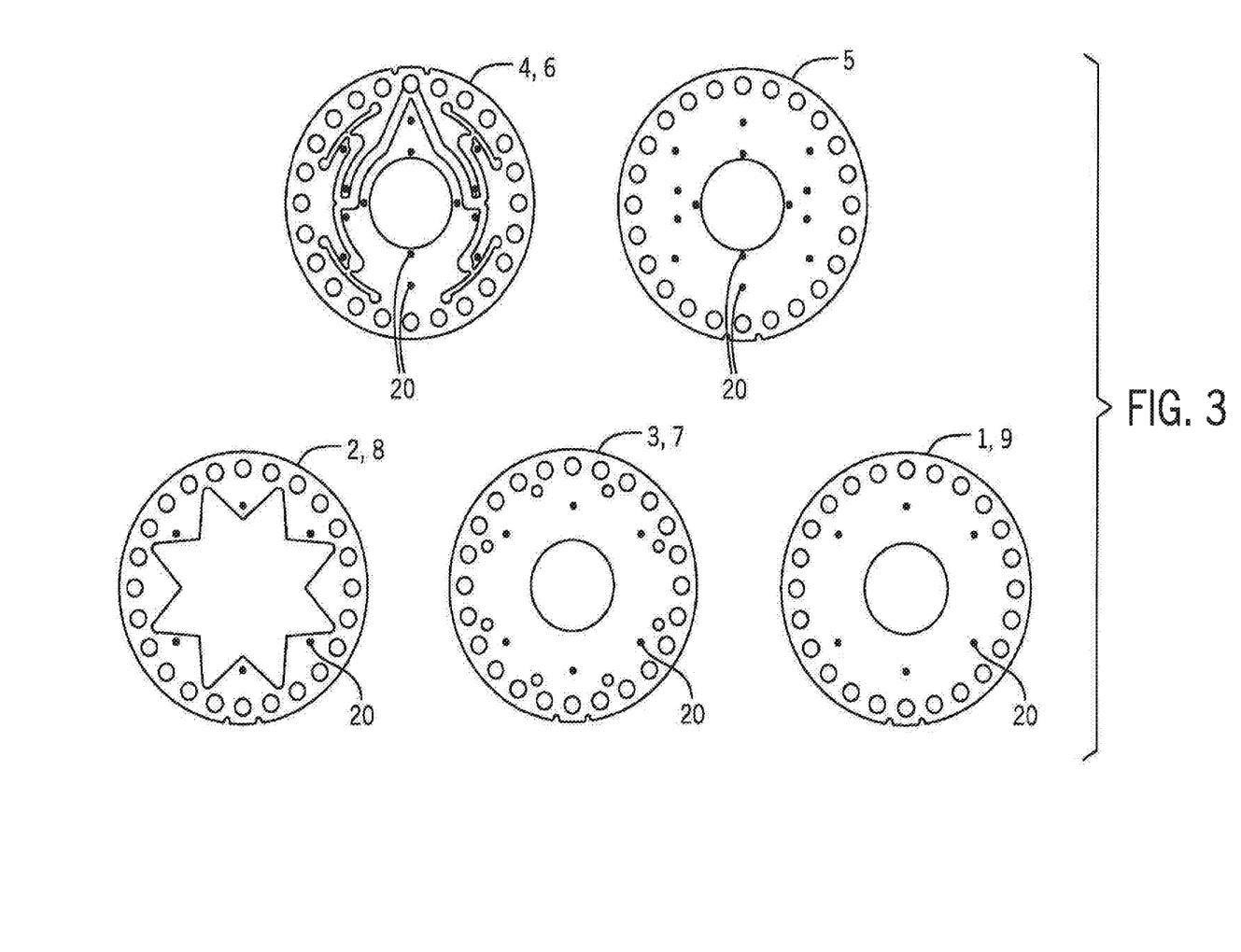
FIG. 3 is a plan view of the individual thin annular disks, showing the spots where adjacent disks may be welded together or fastened with roll pins for improved strength and integrity.

When welding adjacent disks together, it is important to avoid forming high points or mounds on the disks that might interfere with their interfacial contact. Such mounds can be avoided by forming small (e.g., 0.125 inch) openings in the disks at the location of the welds. The small (e.g. 0.125 inch) openings may also serve as strengthening and alignment points for insertion of 0.125-inch roll pins of suitable length so that welding may not be needed. One advantage of roll pins is that they can be inserted and later removed, whereas welding is permanent. A typical roll pin includes a hollow tube with a slot opening extending lengthwise along its outer surface. When the roll pin is squeezed, inserted into an opening and released, it acts like a spring as the roll pin grips the opening that it is inserted into. The spring force keeps the adjacent disks from coming apart. FIG. 3 shows exemplary points where the small openings may be formed to enable the welding or the insertion of roll pins. The small openings 20 are indicated for disks 4 and 6 (distribution disks), disk 5 (central routing disk), disks 2 and 8 (spreader disks), disks 3 and 7 (transition disks) and disks 1 and 9 (cap disks). As shown in FIG. 3, the distribution disks 4 and 6 and central routing disk 5 each have a relatively large number of small openings 20 that align with small openings 20 of adjacent disks and may be used to fasten those disks together for improved structural integrity. The spreader disks 2 and 8 can be combined and fastened to the adjacent transition disks 3 and 7 and the cap disks 1 and/or 9 using relatively fewer small openings 20 used for welding or insertion of roll pins.

Alternatively, the formation of high points can be avoided by employing a cold welding process available from Meld Manufacturing Corporation in Christiansburg, Va. Variations of the cold welding process are described in various U.S. patents issued to Aeroprobe Corporation including, for example, U.S. Pat. Nos. 10,105,790, 9,862,054, 9,511,446, 9,511,445, and 8,893,954. The cold welding process is believed capable of amalgamating any metal, not limited to silver, and can be used to weld the thin, annular disks together without distortion.

The modular disk coextrusion die 10 formed of the plurality of cells 100A through 100L can be assembled and connected to a plurality of extruders using known techniques, such as those described in U.S. Pat. No. 5,762,971, issued to Schirmer, the disclosure of which is incorporated by reference. For ease of description, FIG. 1 of U.S. Pat. No. 5,762,971 is included herewith as FIG. 4, with some modification. Referring to FIG. 4, the coextrusion device 500 includes a central extruder delivery system 512b and two satellite extruder delivery systems 512a (not shown) and 512c, employing a modular disk coextrusion die 10 constructed of thin annular disks as described above. The extruder delivery systems 512a, 512b and 512c may be driven using common or separate drives and may be used to deliver three polymer resins or melt streams, or more than three if the melt streams are split. The modular disk coextrusion die 10 is sandwiched between an inlet plate 540 and an outlet plate 560 which are snugly bolted together using threaded bolt assemblies 541 and 550 in order to maintain the thin annular disks in a snug-fitting arrangement. Although only one extruder is illustrated, the extruder delivery systems 512a, 512b and 512c may be repeated around two to four of the quadrants 140, 150, 160 and 170 of the die plate 506 as shown in FIG. 5, thus utilizing up to twelve extruders for delivering twelve separate melt streams.

In the extrusion device 500 of FIG. 4, the modular disk coextrusion die 10 is oriented for downward extrusion of a blown film bubble, in contrast to the upward extrusion arrangement described with respect to FIG. 2. Thus, the extrusion device feeds the melt streams to the top of the modular disk coextrusion die 10 through an extension 504 and die plate 506, and the melt streams flow downward through the die 10. A mandrel 514 passes through the annular center of the modular disk coextrusion die 10, allowing enough space for the multilayer tube to pass through the annular center around the mandrel as the layers are being formed. While the illustration in FIG. 4 is exemplary, the parts are not shown proportional to size. For instance, the modular disk coextrusion die 10 will be relatively taller and the number of thin annular disks will be greater when several of the individual cells are stacked together as shown in FIG. 2.

Figure 5:
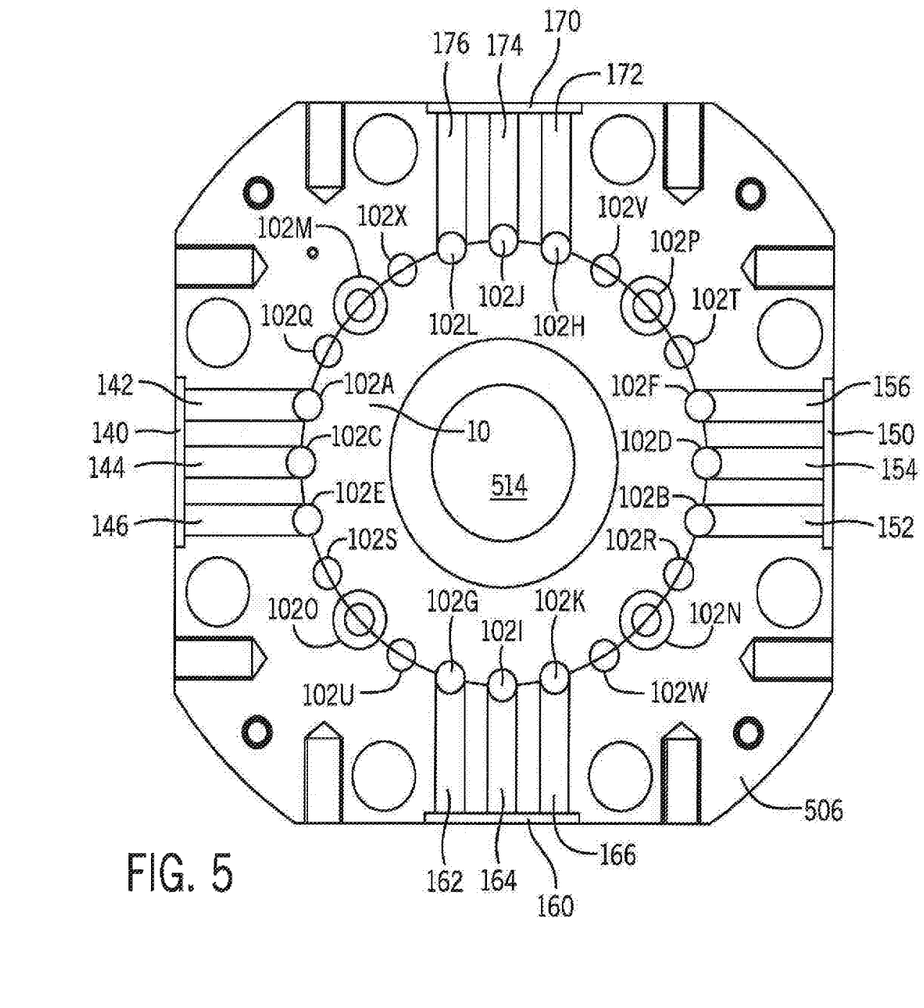
FIG. 5 schematically illustrates an entry section of one embodiment of a modular disk coextrusion die assembly, showing melt extrusion inlets in all four quadrants.

FIG. 5 schematically illustrates an entry section of one embodiment of a modular disk coextrusion die assembly in which twelve of the inlet openings 102A-102L are used to receive polymer melt streams, four of the inlet openings 102M-102P are used to receive bolt fasteners, and eight of the openings 102Q-102X are not used at all. Polymer from a first extruder 140 is split into three streams 142, 144 and 146, which enter the modular disk coextrusion die through inlets 102A, 102C and 102E. Polymer from a second extruder 150 is split into three streams 152, 154 and 156, which enter the modular disk coextrusion die through inlets 102B, 102D and 102F. Polymer from a third extruder 160 is split into three streams 162, 164 and 166, which enter the modular disk coextrusion die through inlets 102G, 102I and 102K. Polymer from a fourth extruder 170 is split into three streams 172, 174 and 176, which enter the modular disk coextrusion die through inlets 102H, 102J and 102L. Again, the direction of extrusion may be upward or downward through the modular disk coextrusion die 10, to form an upward or downward oriented blown film bubble.

Figure 6:
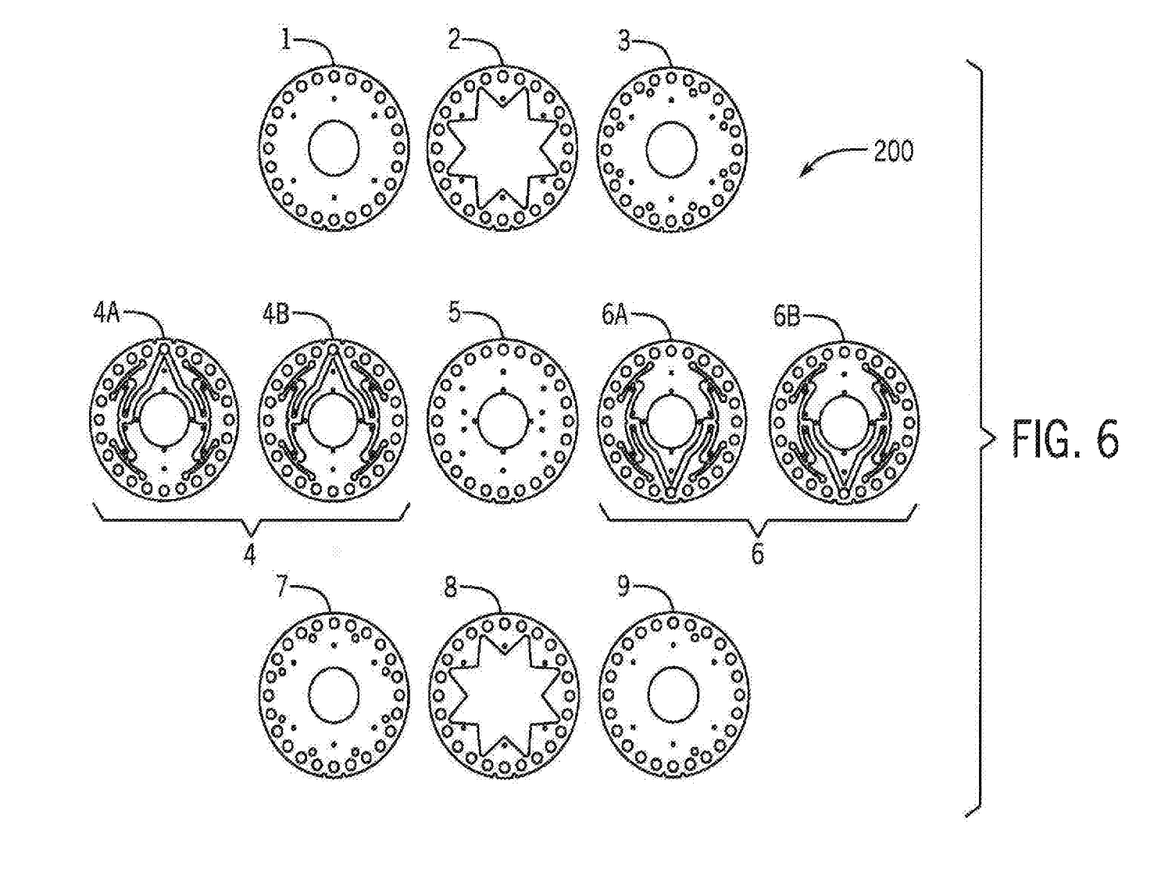
FIG. 6 shows a top-to-bottom lineup of thin annular disks used to form a second embodiment of a single cell of the modular disk coextrusion die of the invention, with each disk shown in plan view.

As will be appreciated by persons of ordinary skill in the art, some of the thin annular disks in an individual cell can be replicated in sequence to create what is, in effect, a thicker version of the same thin annular disk. FIG. 6 schematically illustrates an embodiment of a single cell 200 in which the distribution disks have been doubled to provide thicker versions thereof. Cell 200 includes, in numerical order from top to bottom or from bottom to top (depending on the direction of extrusion), first cap disk 1, spreader disk 2, transition disk 3, distribution disks 4A and 4B, central routing disk 5, distribution disks 6A and 6B, transition disk 7, spreader disk 8, and optional second cap disk 9. As with the above-described embodiment, the first cap disk 1 of each subsequent cell can perform the function of second cap disk 9 in the preceding cell, thus alleviating the need for a second cap disk 9 between adjacent cells. The cell 200 functions the same as the cell 100 described above, except that the doubling of distribution disks 4A and 4B and the doubling of distribution disks 6A and 6B provide thicker overall distribution disks 4 and 6 for easier distribution of the melt. Other disks in the cell can similarly be doubled, or more than doubled, to create thicker disks that perform the respective functions more easily. The ability to multiply the effective thickness of selected disks by stacking two or more identical disks together is especially useful when the melt stream contains a high velocity polymer, or another polymer that is more difficult to process. Depending on the needs of the specific application, the cell 200 of FIG. 6 (or any cell in which the thickness of one or more disks has been multiplied) can replace selected ones or all of the cells 100A-100L in FIG. 2.

Figure 7:
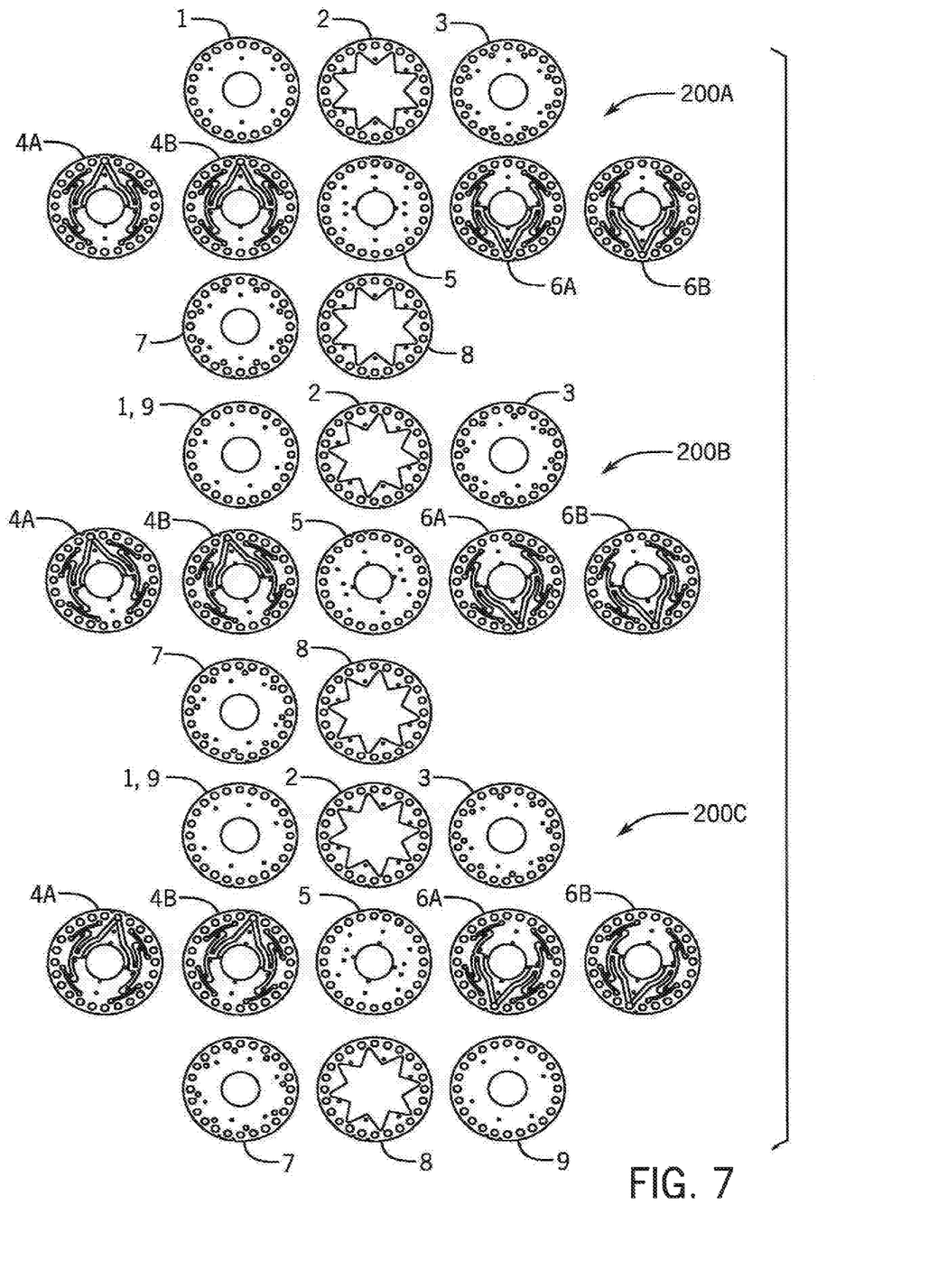
FIG. 7 shows a left-to-right and top-to-bottom lineup of three of the cells of thin annular disks shown in FIG. 6, that can be stacked together to form a modular disk coextrusion die of the invention.

The multiplying of the distribution disks as shown in FIG. 6 enables the use of more complex opposing disk arrangements. FIG. 7 illustrates an arrangement of three cells 200A, 200B and 200C, which can be stacked together from top to bottom or bottom to top depending on the direction of extrusion. The three cells can receive polymer from three inlets in any one of the four quadrants of the extrusion die 506 shown in FIG. 5, such as from the left quadrant (inlets 142, 144, 146), the right quadrant (inlets 152, 154, 156), the bottom quadrant (inlets 162, 164, 166) or the top quadrant (inlets 172, 174, 176). While only three cells are shown for sake of brevity, it would take twelve cells stacked together as shown in FIG. 2 to process polymer from all twelve inlets in all four quadrants of the extrusion die 506.

Each of the cells 200A, 200B and 200C includes the above-described first cap disk 1, spreader disk 2, transition disk 3, distribution disks 4A and 4B, central routing disk 5, distribution disks 6A and 6B, transition disk 7, and spreader disk 8. In the embodiment of FIG. 7, the first cap disk 1 of each subsequent cell performs the function of the cap disk 9 for the preceding cell, thus eliminating the need for a separate cap disk 9 between adjacent cells. Except for the fact that FIG. 7 illustrates a downward extrusion, whereas FIG. 2 illustrates an upward extrusion, the cells 200A, 200B and 200C function in the same manner as the cells 100A, 100B and 100C in FIG. 2, with additional benefits coming from doubling the thickness of the distribution disks 4 and 6.

The large number of layers is enabled by the relative thinness of the disks and the fact that they can be fastened together for improved strength as described above. In one exemplary embodiment, each individual cell 100 (consisting of 8-11 disks) has a diameter of 8 inches and a thickness of about 0.43 inch. A 1× die may use a single mandrel that provides a collective disk height of up to about 17 inches. This provides for as many as 40 cells (17 divided by 0.43), which can produce 80 nanolayers. A 2× die may use two mandrels that can provide a maximum height of about 31 inches for cells. This provides for as many as 72 cells (31 divided by 0.43), which can produce 144 nanolayers. A 3× die may have three mandrels that can provide a maximum height of about 45 inches for cells. This provides for as many as 105 cells (45 divided by 0.43), which can produce 210 nanolayers. By combining larger numbers of mandrels, and/or using longer mandrels, the number of nanolayers can be increased to any desired level.

The modular disk coextrusion die 10 with the opposing disk arrangement enables the production of a wide variety of complex multilayer coextruded annular films, each including many continuous unbroken and non-overlapping annular nanolayers arranged in sequence. The phrase "continuous, unbroken and non-overlapping" means that each of the nanolayers and the overall film is a) continuous in the annular direction, b) devoid of breaks and discontinuities in the annular direction, and c) devoid of overlapping folds, i.e., no annular portion of any nanolayer or the overall film is folded over onto itself in a manner that would multiply the film thickness at that location.

The modular disk coextrusion die 10 can be used to produce complex films in which any sequence of nanolayers formed using up to twelve or more polymer melt streams can be optimized to provide optimal combinations of oxygen barrier, moisture barrier, strength and/or other desired properties. Large sequences of layers called "repeating units" can be included in the nanolayer films and can be repeated many times. In one embodiment, the multilayer coextruded annular film including the plurality of continuous unbroken and overlapping nanolayers can include a number "x" of repeating units that define a repeating sequence of nanolayers. Each repeating unit includes a number "y" of nanolayers and includes at least three layers having polymer compositions that differ from each other. The number "x" is an integer of at least 2, or at least 3, or at least 4, or at least 5, or at least 6, or at least 7, or at least 8, or at least 9, or at least 10, or at least 11, or at least 12. The number "y" is an integer of at least 3, or at least 4, or at least 5, or at least 6, or at least 7, or at least 8, or at least 9, or at least 10, or at least 11, or at least 12. The product of x multiplied by y is at least 24, or at least 36, or at least 48, or at least 60, or at least 72, or at least 84, or at least 96, or at least 108, or at least 120, or at least 132, or at least 144, or at least 156, or at least 168, or at least 180, or at least 192, or at least 204. Depending in part on the number "y" of nanolayers in each repeating unit, at least three, or at least four, or at least five, or at least six, or at least seven, or at least eight, or at least nine, or at least ten, or at least eleven, or at least twelve of the nanolayers in the repeating unit have polymer compositions that differ from each other.

Various combinations of "x," "y" and the product of "x" and "y" are contemplated. In one embodiment, "x" is at least 2 and "y" is at least 12. In another embodiment, "x" is at least 3 and "y" is at least 8. In another embodiment, "x" is at least 4 and "y" is at least 6. In another embodiment, "x" is at least 6 and "y" is at least 4. In another embodiment, "x" is at least 8 and "y" is at least 3. In another embodiment, "x" is at least 8 and "y" is at least 4. In another embodiment, "x" is at least 24 and "y" is at least 4. In another embodiment, "x" is at least 24 and "y" is at least 3. In another embodiment, "x" is at least 64 and "y" is at least 3. In another embodiment, "x" is at least 48 and "y" is at least 4. The foregoing embodiments are exemplary and non-limiting. And combination of "x," "y" and the product of "x" and "y" is contemplated, so long as "x" is at least 2, "y" is at least 3, and the product of "x" and "y" is at least 24.

The nanolayer film structures can include a wide variety of polymer combinations designed to optimize properties such as oxygen barrier, moisture barrier, adhesion between layers, film strength and optics. Examples of oxygen barrier polymers include without limitation polyamides, ethylene vinyl alcohols, polyketones, polyvinyl chlorides, copolymers of vinyl chloride and methyl acrylate, copolymers of vinyl chloride and ethyl acrylate, and combinations thereof. Polyamides include without limitation Nylon 6, Nylon 4-6, Nylon 6-6, Nylon 6-9, Nylon 6-10, Nylon 6-12, Nylon 11 and Nylon 12. Ethylene vinyl alcohol includes copolymers of ethylene and vinyl alcohol having ethylene contents ranging from about 25% to about 50% by mol, including without limitation those having molar ethylene contents of 27%, 29%, 32%, 38%, 44% and 48%. Polyketones are copolymers and terpolymers of olefins and carbon monoxide, including without limitation ethylene-carbon monoxide, propylene-carbon monoxide, ethylene-propylene-carbon monoxide and the like. Polyketones and polyvinyl chlorides provide both oxygen barrier and moisture barrier, unlike many gas barrier polymers that provide oxygen barrier but little or no moisture barrier.

Moisture barrier polymers include without limitation polyolefins such as polyethylene, polypropylene, polybutene, ethylene-alpha olefin copolymers; polyvinyl chlorides (especially polyvinyl dichloride); and polyketones. Polyethylenes include high density polyethylene and branched low density polyethylene. Ethylene-alpha olefin copolymers are copolymers of ethylene and one or more comonomers selected from $C_3$ to $C_{10}$ alpha-olefins. Examples include linear medium density polyethylene, linear low density polyethylene, very low density polyethylene and ultra-low density polyethylene. The most common comonomers are propylene, butene, hexene and octene. The density generally decreases as the amount of comonomer is increased.

Adhesive tie resins are typically needed to bond oxygen barrier and moisture barrier layers together, and/or to bond both oxygen barrier and moisture barrier layers to the high strength polymer layers described below. Adhesive tie resins include without limitation ethylene vinyl acetate, ethylene methyl acrylate, ethylene ethyl acrylate, ethylene methyl methacrylate, ethylene acrylic acid, ethylene methacrylic acid, anhydride-modified polyolefins such as polyethylene, polypropylene and polybutene, anhydride-modified ethylene-alpha olefin copolymers, and ionomers. Elastomers such as styrene-butadiene, styrene-butadiene-styrene, styrene-ethylene-butadiene-styrene, and polycaprolactones can also be used alone or in combination with other adhesive tie polymers to provide enhanced adhesion between adjacent layers.

High strength polymers can be employed to provide enhanced film strength, abuse resistance and, in some cases, improved optical properties. High strength polymers include without limitation polyesters such as polyethylene terephthalate, polybutylene terephthalate, polyethylene terephthalate-1,4-cyclohexane-2-methyl ester, polycarbonate, polycyclohexylene-dimethylene terephthalate, polyphthlate carbonate, polytrimethylene terephthalate; polycarbonates; polystyrenes; polyvinyl chlorides; polyacrylonitrile; and styrene acrylonitrile.

Examples of multilayer coextruded annular films that possess the continuous unbroken and non-overlapping nanolayers include films having any of the foregoing combinations of "x" and "y" in the repeating units, and including, but not limited to, the following examples:

1. A multilayer coextruded annular film including a plurality of continuous unbroken and non-overlapping annular nanolayers arranged in sequence;
   the plurality of nanolayer comprising a number "x" of repeating units defining a repeating sequence of nanolayers;
   each repeating unit including a number "y" of nanolayers, including at least three nanolayers having polymer compositions that differ from polymer compositions of each other;
   wherein "x" is an integer of at least 2, "y" is an integer of at least 3, and "x" multiplied by "y" is at least 24.
2. The multilayer coextruded annular film (1), wherein "x" is at least 2 and "y" is at least 12.
3. The multilayer coextruded annular film (1), wherein "x" is at least 3 and "y' is at least 8.
4. The multilayer coextruded annular film (1), wherein "x" is at least 4 and "y" is at least 6.
5. The multilayer coextruded annular film (1), wherein "x" is at least 6 and "y" is at least 4.
6. The multilayer coextruded annular film (1), wherein "x" is at least 8 and "y" is at least 3.
7. Any of the preceding multilayer coextruded annular films (1) to (6), wherein at least one nanolayer in the repeating unit includes a polyamide, at least one nanolayer in the repeating unit includes an ethylene vinyl alcohol, and at least one nanolayer in the repeating unit includes an adhesive tie resin.
8. Any of the preceding multilayer coextruded annular films (1) to (6), wherein at least one nanolayer in the repeating unit includes a polyolefin, at least one nanolayer in the repeating unit includes a polyamide, and at least one nanolayer in the repeating unit includes an adhesive tie resin.
9. Any of the preceding multilayer coextruded annular films (1) to (6), wherein at least one nanolayer in the repeating unit includes a polyolefin, at least one nanolayer in the repeating unit includes an ethylene vinyl alcohol, and at least one nanolayer in the repeating unit includes an adhesive tie resin.
10. Any of the preceding multilayer coextruded annular films (1) to (6), wherein at least one nanolayer in the repeating unit includes a polyester, at least one nanolayer in the repeating unit includes a polyolefin, and at least one nanolayer in the repeating unit includes an adhesive tie resin.
11. The multilayer coextruded annular film (10), wherein the polyester includes polyethylene terephthalate, the polyolefin includes polyethylene, the adhesive tie resin comprises ethylene methyl acrylate, and the repeating unit includes a sequence of nanolayers that include the following polymers in either order: polyethylene terephthalate/ethylene methyl acrylate/polyethylene.
12. The multilayer coextruded annular film (10), wherein the polyester includes polyethylene terephthalate-1,4-cyclohexane-2-methyl ester, the polyolefin includes polyethylene, the adhesive tie resin includes ethylene methyl acrylate, and the repeating unit includes a sequence of nanolayers that include the following polymers in either order: polyethylene terephthalate-1,4-cyclohexane-2 methyl ester/ethylene methyl acrylate/polyethylene.
13. Any of the preceding multilayer coextruded annular films (1) to (6), wherein at least one nanolayer in the repeating unit includes a polycarbonate, at least one nanolayer in the repeating unit includes a polyolefin, and at least one nanolayer in the repeating unit includes an adhesive tie resin.
14. The multilayer coextruded annular film (13), wherein the polyolefin includes polyethylene, the adhesive tie resin includes ethylene methyl acrylate, and the repeating unit comprises a sequence of nanolayers that include the following polymers in either order: polycarbonate/ethylene methyl acrylate/polyethylene.
15. Any of the preceding multilayer coextruded annular films (1) to (6), wherein at least one nanolayer in the repeating unit includes ethylene vinyl alcohol, at least two nanolayers in the repeating unit include an adhesive tie resin, and at least one nanolayer in the repeating unit includes a polyamide.
16. Any of the preceding multilayer coextruded annular films (1) to (6), wherein at least one nanolayer in the repeating unit includes ethylene vinyl alcohol, at least two nanolayers in the repeating unit include a polyamide, at least one layer in the repeating unit includes a polyolefin, and at least one layer in the repeating unit includes an adhesive tie resin.
17. Any of the preceding multilayer coextruded annular films (1) to (6), wherein the repeating unit includes a sequence of nanolayers that include the following polymers in either order: polyethylene/polyethylene/tie resin/Nylon 6/tie resin/ethylene vinyl alcohol/tie resin/Nylon 6-10/tie resin/ethylene vinyl alcohol/tie resin/Nylon 6-10.
18. Any of the preceding multilayer coextruded annular films (1) to (6), wherein the repeating unit includes a sequence of nanolayers that include the following polymers in either order: ethylene vinyl alcohol/tie resin/polyethylene/tie resin/Nylon 6/tie resin/Nylon 6-10/tie resin.
19. Any of the preceding multilayer coextruded annular films (1) to (6), wherein the repeating unit includes a sequence of nanolayers that include the following polymers in either order: tie resin/ethylene vinyl alcohol/tie resin/high density polyethylene/tie resin/Nylon 6/tie resin/high density polyethylene.
20. Any of the preceding multilayer coextruded annular films (1) to (6), wherein at least one nanolayer in the repeating unit includes a polyvinyl chloride, at least one nanolayer in the repeating unit includes an ethylene vinyl alcohol, and at least one nanolayer in the repeating unit includes an adhesive tie resin.

21. Any of the preceding multilayer coextruded annular films (1) to (6), wherein at least one nanolayer in the repeating unit includes a polyvinyl chloride, at least one nanolayer in the repeating unit includes a polyamide, and at least one nanolayer in the repeating unit includes an adhesive tie resin.

22. Any of the preceding multilayer coextruded annular films (1) to (6), wherein at least one nanolayer in the repeating unit includes a polyolefin, at least one nanolayer in the repeating unit includes a polyvinyl chloride, and at least one nanolayer in the repeating unit includes an adhesive tie resin.

23. Any of the preceding multilayer coextruded annular films (1) to (6), wherein at least one nanolayer in the repeating unit includes a polyester, at least one nanolayer in the repeating unit includes a polyvinyl chloride, and at least one nanolayer in the repeating unit includes an adhesive tie resin.

24. Any of the preceding multilayer coextruded annular films (1) to (6), wherein at least one nanolayer in the repeating unit includes a polycarbonate, at least one nanolayer in the repeating unit includes a polyvinyl chloride, and at least one nanolayer in the repeating unit includes an adhesive tie resin.

25. Any of the preceding multilayer coextruded annular films (1) to (6), wherein at least one nanolayer in the repeating unit includes a polyketone, at least one nanolayer in the repeating unit includes an ethylene vinyl alcohol, and at least one nanolayer in the repeating unit includes an adhesive tie resin.

26. Any of the preceding multilayer coextruded annular films (1) to (6), wherein at least one nanolayer in the repeating unit includes a polyketone, at least one nanolayer in the repeating unit includes a polyamide, and at least one nanolayer in the repeating unit includes an adhesive tie resin.

27. Any of the preceding multilayer coextruded annular films (1) to (6), wherein at least one nanolayer in the repeating unit includes a polyester, at least one nanolayer in the repeating unit includes a polyketone, and at least one nanolayer in the repeating unit includes an adhesive tie resin.

28. Any of the preceding multilayer coextruded annular films (1) to (6), wherein at least one nanolayer in the repeating unit includes a polyolefin, at least one nanolayer in the repeating unit includes a polyketone, and at least one nanolayer in the repeating unit includes an adhesive tie resin.

29. Any of the preceding multilayer coextruded annular films (1) to (6), wherein at least one nanolayer in the repeating unit includes polyethylene terephthalate, at least one nanolayer in the repeating unit includes a polyketone, and at least one nanolayer in the repeating unit includes an adhesive tie resin.

30. Any of the preceding multilayer coextruded annular films (1) to (6), wherein at least one nanolayer in the repeating unit includes a copolymer of vinyl chloride and methyl acrylate or ethyl acrylate, at least one nanolayer in the repeating unit includes an ethylene vinyl alcohol, and at least one nanolayer in the repeating unit includes an adhesive tie resin.

31. Any of the preceding multilayer coextruded annular films (1) to (6), wherein at least one nanolayer in the repeating unit includes a copolymer of vinyl chloride and methyl acrylate or ethyl acrylate, at least one nanolayer in the repeating unit includes a polyamide, and at least one nanolayer in the repeating unit includes an adhesive tie resin.

32. Any of the preceding multilayer coextruded annular films (1) to (6), wherein at least one nanolayer in the repeating unit includes a polyester, at least one nanolayer in the repeating unit includes a copolymer of vinyl chloride and methyl acrylate or ethyl acrylate, and at least one nanolayer in the repeating unit includes an adhesive tie resin.

33. Any of the preceding multilayer coextruded annular films (1) to (6), wherein at least one nanolayer in the repeating unit includes a polyolefin, at least one nanolayer in the repeating unit includes a copolymer of vinyl chloride and methyl acrylate or ethyl acrylate, and at least one nanolayer in the repeating unit includes an adhesive tie resin.

34. Any of the preceding multilayer coextruded annular films (1) to (6), wherein at least one nanolayer in the repeating unit includes a polycarbonate, at least one nanolayer in the repeating unit includes a copolymer of vinyl chloride and methyl acrylate or ethyl acrylate, and at least one nanolayer in the repeating unit includes an adhesive tie resin.

35. Any of the preceding multilayer coextruded annular films (7) to (34), wherein "x" is at least 8, "y" is at least 4, and "x: multiplied by "y" is at least 96.

36. Any of the preceding multilayer coextruded annular films (7) to (34), wherein "x" is at least 24, "y" is at least 3, and "x: multiplied by "y" is at least 96.

37. A multilayer coextruded annular film including a plurality of continuous unbroken and non-overlapping annular nanolayers arranged in sequence;
the plurality of nanolayers including a number "x" of repeating units defining a repeating sequence of nanolayers;
each repeating unit including a number "y" of nanolayers, including at least three nanolayers having polymer compositions that differ from polymer compositions of each other;
wherein "x" is an integer of at least 8, "y" is an integer of at least 4, and "x" multiplied by "y" is at least 96.

38. The multilayer coextruded annular film (37), wherein at least four of the nanolayers in the repeating unit have polymer compositions that differ from each other.

39. The multilayer coextruded annular film of (37) or (38), wherein "x" is an integer of at least 24.

40. A multilayer coextruded annular film including a plurality of continuous unbroken and non-overlapping annular nanolayers arranged in sequence;
the plurality of nanolayer including a number "x" of repeating units defining a repeating sequence of nanolayers;
each repeating unit including a number "y" of nanolayers, including at least three nanolayers having polymer compositions that differ from polymer compositions of each other;
wherein "x" is an integer of at least 24, "y" is an integer of at least 3, and "x" multiplied by "y" is at least 192.

41. The multilayer coextruded annular film of (40), wherein "x" is an integer of at least 64 and "y" is an integer of at least 3.

42. The multilayer coextruded annular film (40) or (41), wherein "x" is an integer of at least 48 and "y" is an integer of at least 4.

While the embodiments of the invention described herein are exemplary, various modifications and improvements can be made without departing from the spirit and scope of the invention. The scope of the invention is defined by the appended claims and all changes that fall within the meaning and range of equivalents are intended to be embraced therein.

I claim:

1. A multilayer coextruded annular film comprising a plurality of continuous unbroken and non-overlapping annular nanolayers arranged in sequence;

the plurality of nanolayers comprising a number "x" of a repeating unit defining a repeating sequence of nanolayers;

the repeating unit including a number "y" of nanolayers, including at least three nanolayers having at least three polymer compositions that differ from each other in different ones of the at least three nanolayers;

wherein "x" is an integer of at least 2, "y" is an integer of at least 3, and "x" multiplied by "y" is at least 24.

2. The multilayer coextruded annular film of claim 1, wherein "x" is at least 2 and "y" is at least 12.

3. The multilayer coextruded annular film of claim 1, wherein "x" is at least 3 and "y" is at least 8.

4. The multilayer coextruded annular film of claim 1, wherein "x" is at least 4 and "y" is at least 6.

5. The multilayer coextruded annular film of claim 1, wherein "x" is at least 6 and "y" is at least 4.

6. The multilayer coextruded annular film of claim 1, wherein "x" is at least 8 and "y" is at least 3.

7. The multilayer coextruded annular film of claim 1, wherein at least one nanolayer in the repeating unit includes a polyamide, at least one nanolayer in the repeating unit includes an ethylene vinyl alcohol, and at least one nanolayer in the repeating unit includes an adhesive tie resin.

8. The multilayer coextruded film of claim 1, wherein at least one nanolayer in the repeating unit includes a polyolefin, at least one nanolayer in the repeating unit includes a polyamide, and at least one nanolayer in the repeating unit includes an adhesive tie resin.

9. The multilayer coextruded film of claim 1, wherein at least one nanolayer in the repeating unit includes a polyolefin, at least one nanolayer in the repeating unit includes an ethylene vinyl alcohol, and at least one nanolayer in the repeating unit includes an adhesive tie resin.

10. The multilayer coextruded annular film of claim 1, wherein at least one nanolayer in the repeating unit includes a polyester, at least one nanolayer in the repeating unit includes a polyolefin, and at least one nanolayer in the repeating unit includes an adhesive tie resin.

11. The multilayer coextruded annular film of claim 10, wherein the polyester comprises polyethylene terephthalate, the polyolefin comprises polyethylene, the adhesive tie resin comprises ethylene methyl acrylate, and the repeating unit comprises a sequence of nanolayers that include the following polymers in either order: polyethylene terephthalate/ ethylene methyl acrylate/polyethylene.

12. The multilayer coextruded annular film of claim 10, wherein the polyester comprises polyethylene terephthalate-1,4-cyclohexane-2-methyl ester, the polyolefin comprises polyethylene, the adhesive tie resin comprises ethylene methyl acrylate, and the repeating unit comprises a sequence of nanolayers that include the following polymers in either order: polyethylene terephthalate -1,4-cyclohexane-2 methyl ester/ethylene methyl acrylate/polyethylene.

13. The multilayer coextruded annular film of claim 1, wherein at least one nanolayer in the repeating unit includes a polycarbonate, at least one nanolayer in the repeating unit includes a polyolefin, and at least one nanolayer in the repeating unit includes an adhesive tie resin.

14. The multilayer coextruded annular film of claim 13, wherein the polyolefin comprises polyethylene, the adhesive tie resin comprises ethylene methyl acrylate, and the repeating unit comprises a sequence of nanolayers that include the following polymers in either order: polycarbonate/ethylene methyl acrylate/polyethylene.

15. The multilayer coextruded annular film of claim 4, wherein at least one nanolayer in the repeating unit includes ethylene vinyl alcohol, at least two nanolayers in the repeating unit include an adhesive tie resin, and at least one nanolayer in the repeating unit includes a polyamide.

16. The multilayer coextruded annular film of claim 4, wherein at least one nanolayer in the repeating unit includes ethylene vinyl alcohol, at least two nanolayers in the repeating unit include a polyamide, at least one layer in the repeating unit includes a polyolefin, and at least one layer in the repeating unit includes an adhesive tie resin.

17. The multilayer coextruded annular film of claim 2, wherein the repeating unit comprises a sequence of nanolayers that include the following polymers in either order: polyethylene/polyethylene/tie resin/Nylon 6/tie resin/ethylene vinyl alcohol/tie resin/Nylon 6-10/tie resin/ethylene vinyl alcohol/tie resin/Nylon 6-10.

18. The multilayer coextruded annular film of claim 3, wherein the repeating unit comprises a sequence of nanolayers that include the following polymers in either order: ethylene vinyl alcohol/tie resin/polyethylene/tie resin/Nylon 6/tie resin/Nylon 6-10/tie resin.

19. The multilayer coextruded annular film of claim 3, wherein the repeating unit comprises a sequence of nanolayers that include the following polymers in either order: tie resin/ethylene vinyl alcohol/tie resin/high density polyethylene/tie resin/Nylon 6/tie resin/high density polyethylene.

20. The multilayer coextruded annular film of claim 1, wherein at least one nanolayer in the repeating unit includes a polyvinyl chloride, at least one nanolayer in the repeating unit includes an ethylene vinyl alcohol, and at least one nanolayer in the repeating unit includes an adhesive tie resin.

21. The multilayer coextruded annular film of claim 1, wherein at least one nanolayer in the repeating unit includes a polyvinyl chloride, at least one nanolayer in the repeating unit includes a polyamide, and at least one nanolayer in the repeating unit includes an adhesive tie resin.

22. The multilayer coextruded annular film of claim 1, wherein at least one nanolayer in the repeating unit includes a polyolefin, at least one nanolayer in the repeating unit includes a polyvinyl chloride, and at least one nanolayer in the repeating unit includes an adhesive tie resin.

23. The multilayer coextruded annular film of claim 1, wherein at least one nanolayer in the repeating unit includes a polyester, at least one nanolayer in the repeating unit includes a polyvinyl chloride, and at least one nanolayer in the repeating unit includes an adhesive tie resin.

24. The multilayer coextruded annular film of claim 1, wherein at least one nanolayer in the repeating unit includes a polycarbonate, at least one nanolayer in the repeating unit includes a polyvinyl chloride, and at least one nanolayer in the repeating unit includes an adhesive tie resin.

25. The multilayer coextruded annular film of claim 1, wherein at least one nanolayer in the repeating unit includes a polyketone, at least one nanolayer in the repeating unit includes an ethylene vinyl alcohol, and at least one nanolayer in the repeating unit includes an adhesive tie resin.

26. The multilayer coextruded annular film of claim 1, wherein at least one nanolayer in the repeating unit includes a polyketone, at least one nanolayer in the repeating unit includes a polyamide, and at least one nanolayer in the repeating unit includes an adhesive tie resin.

27. The multilayer coextruded annular film of claim 1, wherein at least one nanolayer in the repeating unit includes a polyester, at least one nanolayer in the repeating unit includes a polyketone, and at least one nanolayer in the repeating unit includes an adhesive tie resin.

28. The multilayer coextruded annular film of claim 1, wherein at least one nanolayer in the repeating unit includes a polyolefin, at least one nanolayer in the repeating unit includes a polyketone, and at least one nanolayer in the repeating unit includes an adhesive tie resin.

29. The multilayer coextruded annular film of claim 1, wherein at least one nanolayer in the repeating unit includes polyethylene terephthalate, at least one nanolayer in the repeating unit includes a polyketone, and at least one nanolayer in the repeating unit includes an adhesive tie resin.

30. The multilayer coextruded annular film of claim 1, wherein at least one nanolayer in the repeating unit includes a copolymer of vinyl chloride and methyl acrylate or ethyl acrylate, at least one nanolayer in the repeating unit includes an ethylene vinyl alcohol, and at least one nanolayer in the repeating unit includes an adhesive tie resin.

31. The multilayer coextruded annular film of claim 1, wherein at least one nanolayer in the repeating unit includes a copolymer of vinyl chloride and methyl acrylate or ethyl acrylate, at least one nanolayer in the repeating unit includes a polyamide, and at least one nanolayer in the repeating unit includes an adhesive tie resin.

32. The multilayer coextruded annular film of claim 1, wherein at least one nanolayer in the repeating unit includes a polyester, at least one nanolayer in the repeating unit includes a copolymer of vinyl chloride and methyl acrylate or ethyl acrylate, and at least one nanolayer in the repeating unit includes an adhesive tie resin.

33. The multilayer coextruded annular film of claim 1, wherein at least one nanolayer in the repeating unit includes a polyolefin, at least one nanolayer in the repeating unit includes a copolymer of vinyl chloride and methyl acrylate or ethyl acrylate, and at least one nanolayer in the repeating unit includes an adhesive tie resin.

34. The multilayer coextruded annular film of claim 1, wherein at least one nanolayer in the repeating unit includes a polycarbonate, at least one nanolayer in the repeating unit includes a copolymer of vinyl chloride and methyl acrylate or ethyl acrylate, and at least one nanolayer in the repeating unit includes an adhesive tie resin.

35. A multilayer coextruded annular film comprising a plurality of continuous unbroken and non-overlapping annular nanolayers arranged in sequence;
the plurality of nanolayers comprising a number "x" of a repeating unit defining a repeating sequence of nanolayers;
the repeating unit including a number "y" of nanolayers, including at least three nanolayers having at least three polymer compositions that differ from each other in different ones of the at least three nanolayers;
wherein "x" is an integer of at least 8, "y" is an integer of at least 4, and "x" multiplied by "y" is at least 96.

36. The multilayer coextruded annular layer of claim 35, wherein at least four of the nanolayers in the repeating unit have polymer compositions that differ from each other.

37. The multilayer coextruded annular film of claim 35, wherein "x" is an integer of at least 24.

38. A multilayer coextruded annular film comprising a plurality of continuous unbroken and non-overlapping annular nanolayers arranged in sequence;
the plurality of nanolayers comprising a number "x" of a repeating unit defining a repeating sequence of nanolayers;
the repeating unit including a number "y" of nanolayers, including at least three nanolayers having at least three polymer compositions that differ from each other in different ones of the at least three nanolayers;
wherein "x" is an integer of at least 24, "y" is an integer of at least 3, and "x" multiplied by "y" is at least 192.

39. The multilayer coextruded annular film of claim 38, wherein "x" is an integer of at least 64 and "y" is an integer of at least 3.

40. The multilayer coextruded annular film of claim 38, Wherein "x" is an integer of at least 48 and "y" is an integer of at least 4.

* * * * *